J. B. DE STEFANO.
AIRSHIP.
APPLICATION FILED MAR. 20, 1918.
1,303,174.
Patented May 6, 1919.
2 SHEETS—SHEET 1.
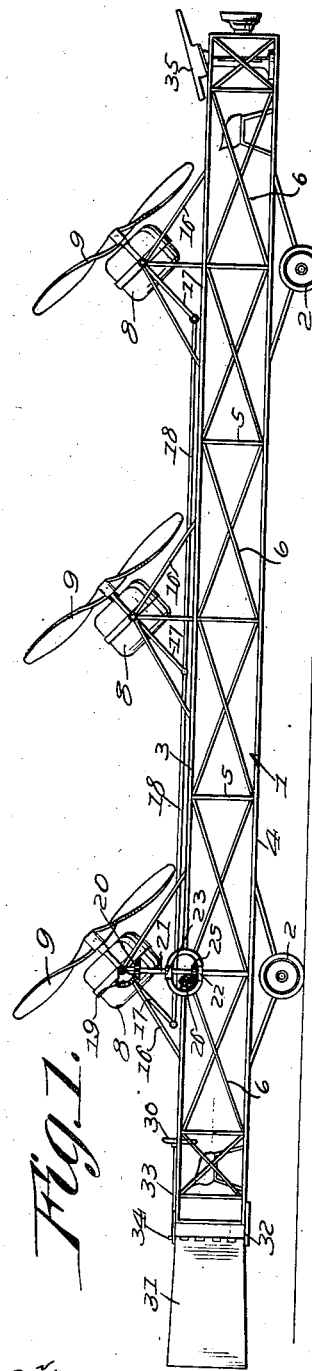
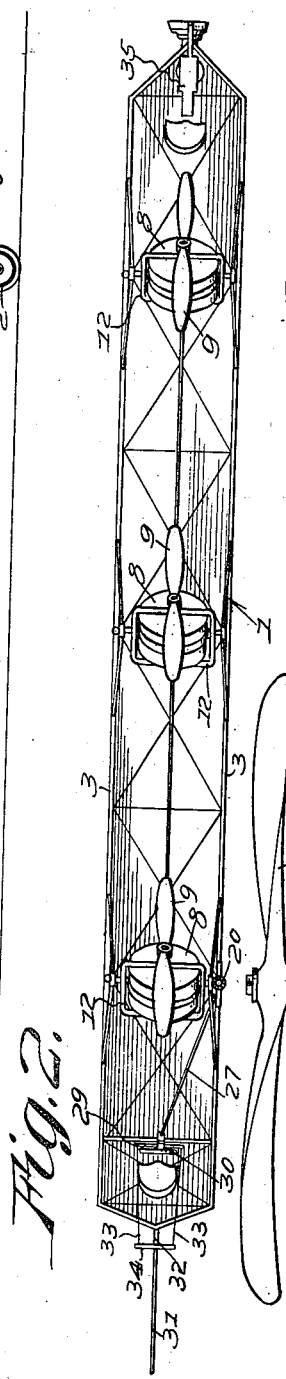
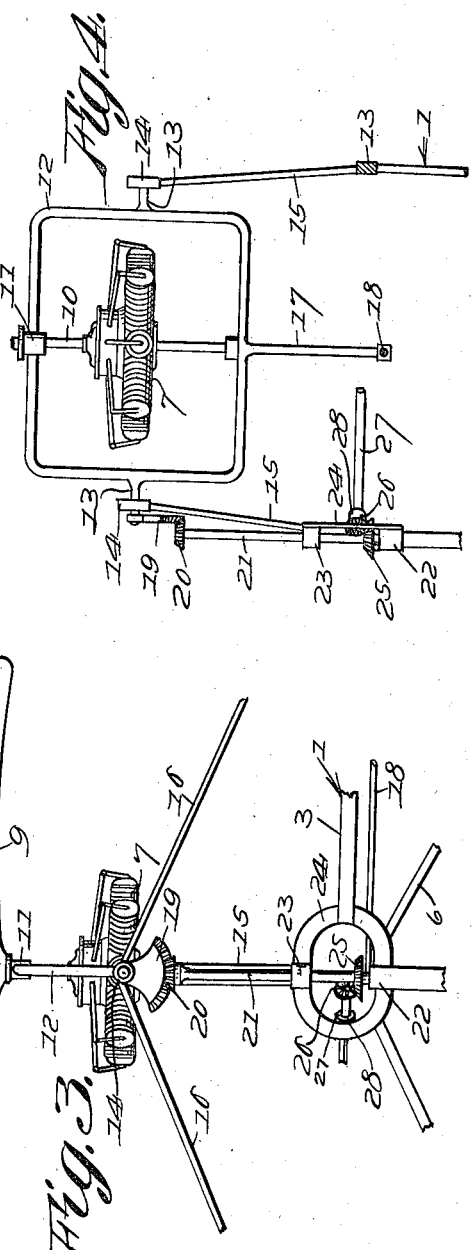
Witnesses:
E. B. Brown
J. S. Ratcliff
Inventor
J. B. De Stefano,
By Chandler & Chandler
Attorneys J. B. DE STEFANO.
AIRSHIP.
APPLICATION FILED MAR. 20, 1918.
1,303,174.
Patented May 6, 1919.
2 SHEETS—SHEET 2.
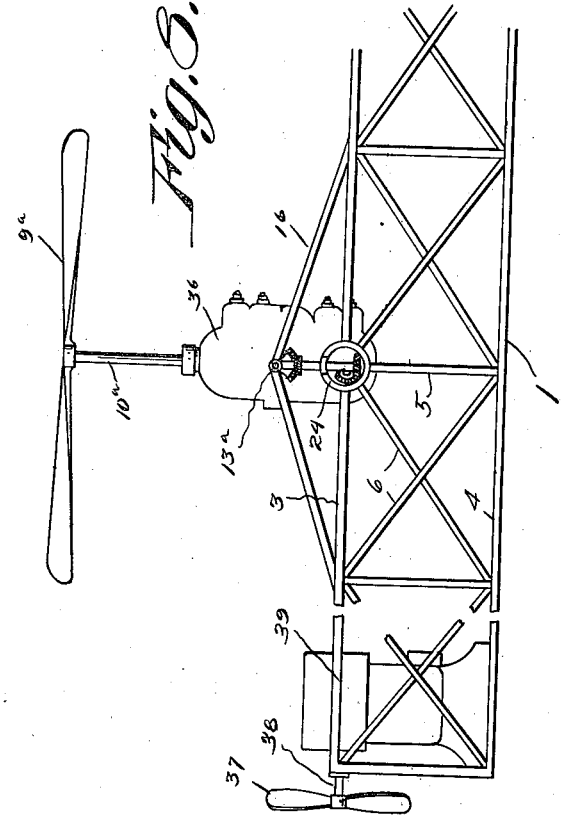
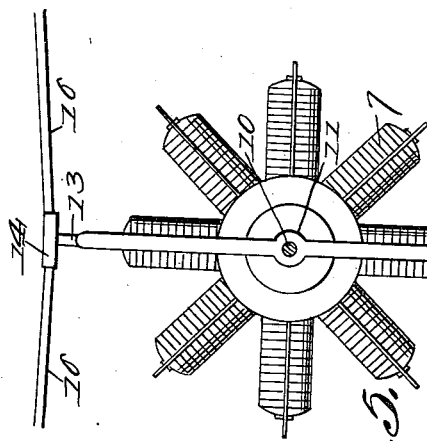
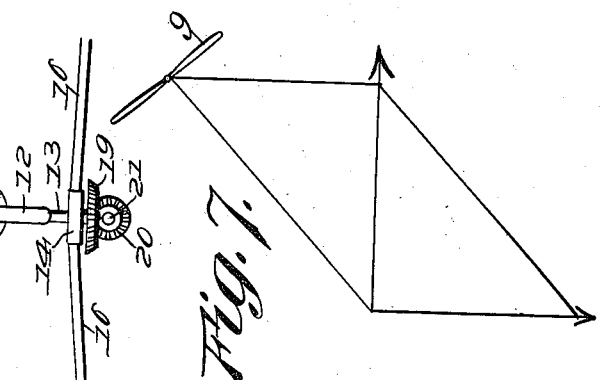
Inventor
J. B. De Stefano,
Attorneys

UNITED STATES PATENT OFFICE.

JOHN B. DE STEFANO, OF NEW YORK, N. Y.

AIRSHIP.

1,303,174.             Specification of Letters Patent.      Patented May 6, 1919.

Application filed March 20, 1918. Serial No 223,515.

*To all whom it may concern:*

Be it known that I, JOHN B. DE STEFANO, a citizen of Italy, residing at New York, in the county of New York, State of New York, have invented certain new and useful Improvements in Airships; and I do hereby declare the following to be a full, clear, and exact description of the invention, such as will enable others skilled in the art to which it appertains to make and use the same.

This invention relates to flying machines.

The object of the invention is to provide an airship of the helicopter type which is upheld and driven by one or a series of propellers, so that supporting planes are not required. Inasmuch as airships of this type do not require the use of widely extended planes, they are particularly adapted to be taken on board of ships and employed as safe guards against submarines. Furthermore, the airship of this type is capable of rising and descending vertically, thereby further reducing the amount of space needed for ascensions and landings, and avoiding the liability of accidents due to poor descents.

A further advantage of this type of airships rests in the fact that without planes, it will be practically invisible to any enemy, and even when rotated provides a very poor target.

Furthermore, an airship built in accordance with the present invention can be operated in practically any kind of weather and can maintain a steady equilibrium without undue effort. Pilots, in plane machines, as the latter are at present constructed, find it necessary, in a retreat, to turn the back of the machine to the pursual and are therefore unable to use the machine guns. The machine constructed according to the present invention can effect a retreat without rendering the machine guns ineffective. It is also the intention of the present invention to provide an airship or flying machine which is capable of reaching a greater velocity than is accomplished by airplanes, but is also more easily managed, so that drivers of great experience are unnecessary.

With the above objects in view, and such others relating to the details of construction, as may hereinafter appear, my invention will now be fully set forth and described, reference being had to the accompanying drawings.

In the drawings:—

Figure 1 is a side elevation,

Fig. 2 is a plan view,

Fig. 3 is an enlarged side elevation of one of the motor mountings,

Fig. 4 is a transverse section showing the motor mountings,

Fig. 5 is a plan view of one of the mountings, the propeller being removed,

Fig. 6 is a horizontal sectional view,

Fig. 7 is a diagram of the elevating and driving forces, and

Fig. 8 is a modified form of the invention.

Referring more particularly to the drawings, 1 represents a frame or body in the form of an elongated car and suitably supported upon the wheels 2. The car 1 is constructed according to any method which will provide a body of maximum strength with minimum weight, and which will afford the least resistance to air currents. It is also necessary, that the body possess the necessary strength to support a series of motors with their operating mechanism and fuel supplies. The sides of the car, therefore, are formed of the upper longitudinal rails 3 and the lower rails 4 which are suitably spaced by the vertical standards 5 and are trussed by means of the diagonal brace bars 6.

Mounted upon the car 1, in a number which accords with the size of the car and the amount of power which must be developed for the successful driving of the car 1 is a plurality of motors 7, said motors 7 being inclosed in the housings 8. In the present embodiment of the invention, the motors are indicated as of the radiating cylinder type, the motors being mounted so that their crank shafts stand vertically to drive a corresponding plurality of propellers 9. The crank shaft extensions 10 of the motors 7 have vertical bearings 11 in rectangular frames 12 which are mounted transversely of the car 1, upon trunnions 13 extended from the sides of the frame 12. The propellers 9 are mounted upon the upper extremities of the shafts 10, above the frames 12, so that they stand clear of all of the parts of the machine and rotate freely in the atmosphere.

The trunnions 13 are mounted in bearings 14 at the upper ends of the standards 15 which, preferably, are continuations of the standards 5 of the car body. The standards 15 are braced forwardly and rearwardly by means of the longitudinal brace rods 16, so that the trunnions 13, bearing the motors 7 and the casings 8 may swing upon the transverse axes provided by said trunnions without warping or racking the car body. The several frames 12 are coupled together so that they may be swung as a unit, and for this purpose downward extensions 17 depending from the lower ends of the frames 12 are alined to provide pivotal supports for the connecting rods 18 through whose medium all motors may be swung when one of their number is operated. As an operating means for all motors, one of trunnions 13 of the shaft motor is provided with a segment 19 having a series of bevel teeth with which a pinion 20 meshes, the latter being carried upon the upper end of a shaft 21. Said shaft 21 is mounted in a step bearing 22 formed upon the upper end of the corresponding frame standard 5, and in a bearing 23 formed upon the upper element of an inclosed bearing casting 24 which is inserted into the framing structure of the car 1. The casting 24 is this case, directly supports the corresponding standard 15, and the shaft 21 lies upon the outer side thereof so that the pinion 20 may be brought into proper mesh with the teeth of the segment 19. Within the casting 24, the shaft 21 is provided with a bevel gear 25 which stands in mesh with a bevel gear 26 mounted upon a controlling shaft 27. The control shaft 27 has its forward end supported in a bearing 28 which is also formed as a part of the bearing casting 24. The bearing 28 is so positioned that the control shaft 27 is directed to a bearing in the middle of a transverse bearing rod 29 near the rear end of the car behind which is located the pilot's position, a steering wheel 30 upon the rear end of the shaft 27 giving the pilot full control of the motors.

The car is steered by means of a rudder 31 which is mounted upon a rudder bracket 32 at the rear of the car, cables 33 extending to the pilot's position having their rear ends attached to a cross bar 34 carried by the rudder, and providing the means for swinging the latter to give the driver complete control of the car.

In the operation of the airship, the plurality of motors is started so that all of the propellers 9 are driven at like speeds. In order to elevate the car the frames 12 are swung to bring the propellers into horizontal position, so that their forces are directed wholly in vertical direction. Then, in order to drive the car forwardly the motors are swung until the propellers 9 stand at inclines to the vertical which cause the car to be pushed forwardly at the proper speed, the propellers then acting both as a lifting and propelling force. The action of the forces is best indicated in the diagram shown in Fig. 7. The airship may have any suitable fighting equipment mounted thereon, as indicated by the machine gun 35 installed in its forward end, and it may also have any other equipment which will adapt it for any special service.

In the form of the invention shown in Fig. 8 a single lifting motor 36 is employed, which is of the Hall-Scott or other similar type including alined cylinders, the shaft $10^a$ of this motor extending upwardly and carrying a propeller $9^a$, and the casing of the motor being provided with pintles $13^a$, similar to the pintles 13 of the rotary motor frame, whereby the motor 36 may be mounted and operated for steering, in the same manner as the rotary motors. In the use of a motor of the Hall-Scott type, a horizontal reaction of the motor would be set up due to the throw of the crank portions of the motor shaft, and to overcome this reaction I employ a propeller 37 mounted at the rear end of a shaft 38 which projects horizontally beyond the steering of the car and which is preferably driven by an auxiliary motor 39 although it may be connected by a train of gears with the shaft of the motor 36, no illustration for this arrangement being provided as any suitable conventional gearing may be employed to compensate for the swinging movement of the motor.

What I claim as my invention is:—

1. In an airship, the combination with a frame, of a plurality of motor casings mounted in the frame for rocking movement, motors in the casings, propellers located outwardly of the casings and mounted for rocking movement therewith, driving connections between the motors and propellers, a segment connected with one of the casings for movement therewith, said segment being provided with rack teeth, a bearing casting incorporated in the frame, a shaft journaled in the bearing casting, a gear carried by the shaft and meshing with the teeth of the segment for movement of the segment to rock the motor casing with which it is connected, a controlling wheel mounted in the frame, a second shaft connected with the controlling wheel and journaled in the bearing casting, gear connections between the two shafts, and connections between the several casings for simultaneous rocking movement thereof.

2. In an airship, the combination with a frame, of a motor casing having trunnions mounted in the frame for rocking movement of the casing, a motor within the casing, a propeller outwardly of the casing and mounted for rocking movement therewith, driving connections between the motor and propeller, a toothed segment carried by one of the trunnions of the casing, an inclosed bearing member incorporated in the frame, a step bearing at the lower portion of said member, a sleeve bearing carried by the member above the step bearing, a shaft journaled in said bearings, a gear carried by the shaft and meshing with the teeth of the segment, a second bearing sleeve carried by the member, a shaft journaled in said second bearing sleeve, gear connections between the two shafts, and a controlling wheel connected with the second shaft for rotation thereof.

In testimony whereof, I affix my signature in the presence of two witnesses.

JOHN B. DE STEFANO.

Witnesses:
GEORGE W. BRETTELL,
LESLIE WILSON.